US007936779B2

(12) United States Patent
Risberg et al.

(10) Patent No.: US 7,936,779 B2
(45) Date of Patent: May 3, 2011

(54) SYSTEM OF INTELLIGENT DEVICES, A METHOD FOR PROVIDING SUCH A SYSTEM AND A COMPUTER DATA SIGNAL

(75) Inventors: Anders Risberg, Västerås (SE); Robert Majanen, Västerås (SE); Xiaohong Jin, Västerås (SE); Mattias Rehnman, Västerås (SE)

(73) Assignee: ABB AB, Västerås (SE)

( * ) Notice: Subject to any disclaimer, the term of this patent is extended or adjusted under 35 U.S.C. 154(b) by 935 days.

(21) Appl. No.: 10/493,658

(22) PCT Filed: Oct. 24, 2002

(86) PCT No.: PCT/SE02/01948
§ 371 (c)(1),
(2), (4) Date: Oct. 29, 2004

(87) PCT Pub. No.: WO03/036873
PCT Pub. Date: May 1, 2003

(65) Prior Publication Data
US 2005/0063317 A1 Mar. 24, 2005

(30) Foreign Application Priority Data

Oct. 24, 2001 (SE) .................................. 0103535-1

(51) Int. Cl.
*H04J 3/16* (2006.01)
(52) U.S. Cl. ....................................... 370/465; 370/282
(58) Field of Classification Search .................. 370/492, 370/468; 455/518; 709/220; 710/56
See application file for complete search history.

(56) References Cited

U.S. PATENT DOCUMENTS 5,867,664 A * 2/1999 Kosugi et al. .................. 710/56
6,324,184 B1 * 11/2001 Hou et al. ..................... 370/468
(Continued)

FOREIGN PATENT DOCUMENTS
WO    WO 0186393 A2    11/2001

OTHER PUBLICATIONS

Yi-Min Wang et al.; "A Toolkit for Building Dependable and Extensible Home Networking Applications"; Technical Report MSR-TR-2000-07; Microsoft Corporation; Feb. 14, 2000; Redmond, WA 98052.

(Continued)

*Primary Examiner* — Donald L Mills
(74) *Attorney, Agent, or Firm* — Venable LLP; Eric J. Franklin

(57) ABSTRACT

A system including a number of intelligent devices connected to each other through a network. The devices are adapted for interacting with each other and automatically discovering new devices by sending and receiving messages over the network. Each intelligent device has a hardware and a software unit. The network includes a plurality of connections having different comminications protocols. The software unit includes a module for discovering a new connection between the devices, identifying the communication protocol of the new connection, and creating a channel adapted for sending and receiving messages between the devices over the determined communication protocol. A method for providing such a system includes connecting an intelligent device to a intelligent device via a connection having a communication protocol, discovering the connection and identifying the communication protocol of the connection, and creating a channel, for each of the devices respectively, adapted for sending and receiving messages between the devices over the determined communication protocol.

29 Claims, 4 Drawing Sheets

U.S. PATENT DOCUMENTS

| | | | |
|---|---|---|---|
| 6,735,446 B1* | 5/2004 | Iwata et al. | 455/518 |
| 6,751,221 B1* | 6/2004 | Saito et al. | 370/392 |
| 6,892,230 B1* | 5/2005 | Gu et al. | 709/220 |
| 7,586,860 B2* | 9/2009 | Shitano et al. | 370/282 |

OTHER PUBLICATIONS

Information Sciences Institute, University of Southern California; "Internet Protocol Darpa Internet Program—Protocol Specification"; Sep. 1981; Information Sciences Institute, University of Southern California.

IBM Corporation; "Discovering Devices and Services in Home Networks—Useful Systems from Information Appliances An IBM White Paper"; Jun. 1999; pp. 1-9 IBM Corporation.

European Patent Office Communication, dated Sep. 12, 2006, issued in connection with counterpart European Application No. 02 782 054.7-2416.

European Patent Office Communication, dated Nov. 20, 2007, issued in connection with counterpart European Application No. 02 782 054.7-2416.

* cited by examiner

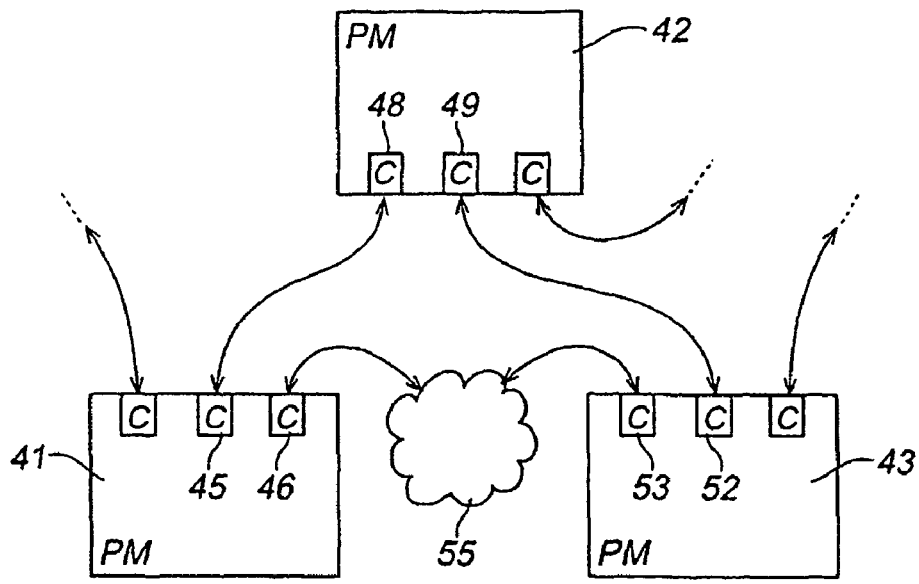
Fig. 4
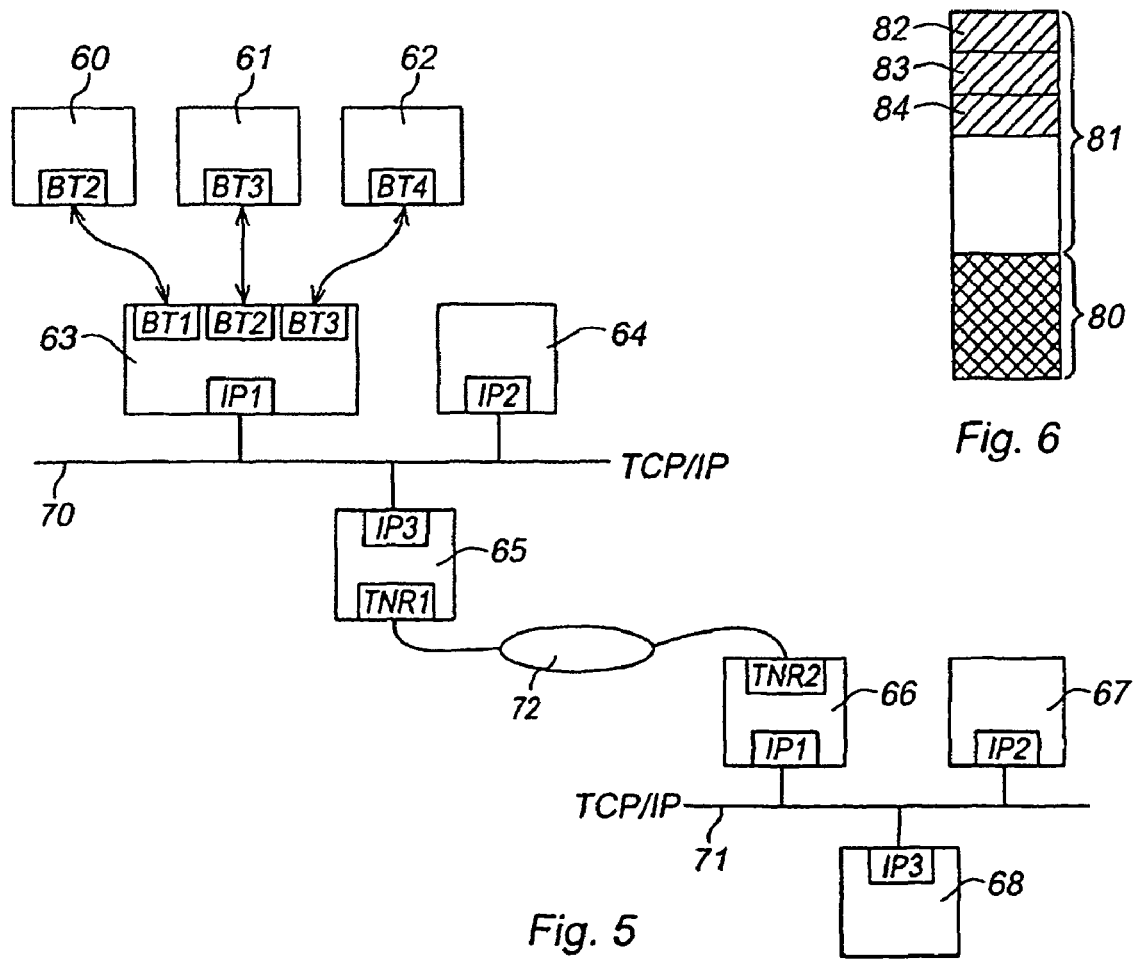
Fig. 5
Fig. 6

SYSTEM OF INTELLIGENT DEVICES, A METHOD FOR PROVIDING SUCH A SYSTEM AND A COMPUTER DATA SIGNAL

CROSS-REFERENCE TO RELATED APPLICATIONS

This application claims priority to Swedish patent application 0103535-1 filed 24 Oct. 2001 and is the national phase under 35 U.S.C. §371 of PCT/SE02/01948 filed 24 Oct. 2002.

1. Field of the Invention

The present invention relates to a method for providing a system of intelligent devices connected to each other through a network, which devices are interacting with each other and automatically discovering new devices by sending and receiving messages over the network.

The invention further relates to a system comprising a number of intelligent devices connected to each other through a network, which devices are adapted for interacting with each other and automatically discovering new devices by sending and receiving messages over the network, each intelligent device having a hardware and a software unit.

The invention further relates to a computer data signal comprising a message communicated between intelligent devices connected to each other through a network, which devices are adapted for interacting with each other and automatically discovering new devices.

The invention further relates to a computer data signal for providing communication in a system of intelligent devices connected to each other through a network, embodied as a message communicated between the devices, which devices are adapted for interacting with each other and automatically discovering new devices.

A device is a physical unit which is able to perform work, for example a sensor, a motor, a valve, a cylinder, an industrial robot, heating, ventilation, and air-conditioning devices, or consumer devices such as washing machines and light appliances. If the device is provided with a hardware unit including a processor and a software unit so that the device is able to perform logical operations, it becomes an intelligent device. The invention is for example suitable for automation in industrial, building, and home context situations in which information is exchanged between devices or between devices and control systems. In particular but not exclusively, the invention is suitable for use in connection with devices comprising embedded intelligence.

2. Prior Art

Modern industrial control systems for process control and manufacturing are developed for use in large automation systems for heavy industries, such as oil and gas, and pulp and paper. These control systems must be able to handle several thousands of data signals and software objects representing real-world entities, which put high demands on the hardware it is running on. In a traditional control system, all communication is done between the control system and the devices and there is no direct communication between the devices. The devices send information to the control system about their status and state, and the control system sends control signals to the devices. This results in large control systems and an extensive network communication between the control systems and the devices. Such large industrial control systems requiring an extensive hardware are not suitable for small customers having only a few devices to control.

It is a trend today to provide embedded intelligence in industrial and consumer devices, so called embedded devices. An embedded device comprises hardware and software for performing operations on data from the device and makes calculations and logic decisions. In general, embedded devices have limited processing power and a limited amount of memory. It is also known to connect embedded devices to a network and to make them communicate with each other. A system of embedded devices are capable of controlling and monitoring the devices locally, and thus the need of a control system is reduced and the communication load in the system is decreased.

A requirement of a control system is that it should be easy to configure when a new device is connected to the system. For that purpose, a number of standards have been developed for automatic recognition of new devices, generally known as Plug and Play. One of the communication standards for home automation is Universal Plug and Play (UPnP). UPnP is an architecture for peer to peer network connectivity between PCs of all types and embedded devices. When a new device is joined to the network, the device will send a message to all of the other devices in the network with information about itself.

The UPnP specifies communication protocols such as Simple Service Protocol (SSDP) for device discovery, Simple Object Access Protocol (SOAP) for remote method invocation and General Event Notification Architecture (GENA) for data subscriptions. These communication protocols are all based on existing Internet protocols, i.e. TCP/IP (Transmission Control Protocol/ Internet Protocol). Accordingly, all communication between devices using UPnP is dependent on TCP/IP. If a message is to be send via another media than the Internet, using another protocol than the TCP/IP, the message has to be translated from TCP/IP to the other protocol. Later, when the message is received, it has to be translated back to TCP/IP before it can be interpreted by the SSDP, GENA and SOAP. Such other media and protocols are for example wireless communication using Bluetooth, direct connection via a series null-modem cable, or communication using telephone modem, Global System for Mobile telecommunications (GSM) or General Packet Radio Service (GPRS). Other useful protocols for wireless communication is UMTS, AMPS or DAMPS.

The TCP/IP generally requires a significant use of memory. Furthermore, the translation between TCP/IP and other protocols takes time as well as requires further memory and processor capacity. This is a disadvantage in connection with small embedded devices which usually have a limited amount of memory and processor capacity. Moreover, when the devices are not connected to the Internet, it is disadvantageous to use TCP/IP.

SUMMARY OF THE INVENTION

The object of the present invention is to provide a method for providing a system of intelligent devices which interact with each other and automatically discover new devices by sending and receiving messages over a network comprising a plurality of different communication protocols and physical connections, a method which is not dependent on a particular protocol and which makes it possible for devices having limited amount of memory to communicate with other devices on the network.

This object is achieved by means of the initially defined method, characterised in that it comprises the step of connecting an intelligent device to another intelligent device via a connection having a communication protocol, discovering the connection and identifying the communication protocol of the connection, creating a channel, for each of the devices respectively, adapted for sending and receiving messages between the devices over the determined communication protocol. With such a method, an intelligent device may be connected to another intelligent device independent of the communication protocol of the connection between them, and the devices are able to send messages to each other without the need to translate between different protocols. Since no translation is needed, less memory and less processor capacity are required. Thanks to the fact that it is possible to choose between different communication protocols, a communication protocol requiring less memory can be chosen in cases of limited memory.

According to a preferred embodiment of the invention, new channels are created by repeating the above steps for at least one further intelligent device which is connected to one of the devices via a connection having a different communication protocol. Thus, an intelligent device can be connected to several other intelligent devices via different protocols.

According to a preferred embodiment of the invention the method comprises the step of disconnecting an intelligent device from another intelligent device, discovering the disconnection and destroying the unconnected channels on each device. Thus, channels are dynamically created and destroyed depending on the connection and disconnection of intelligent devices on the network and each intelligent device will only comprise the channels needed at the moment.

According to a further preferred embodiment of the invention the method comprises the step of creating a message having a destination address field, sending the messages via at least one of the channels of the device. At first the message is created independently of the protocol to be used for sending it, and then the message is sent via one or several channels which take care of the translation of the messages to the protocol needed for sending it. Since the creation and sending of a message are handled separately, it is possible to create the message independently of which protocol is used for sending it, Thus, the creation and handling of messages can be uniform, despite the fact that different communication protocols are used.

According to a further preferred embodiment of the invention, the method comprises the steps of creating a directed message by adding a destination address to the destination address field, the destination address comprising the address of at least one sending channel and at least one receiving channel, and sending the message via the channel specified in the destination address. Since the messages comprise information about which channels the messages is to be sent between, it is easy to handle the sending and forwarding of the messages.

According to a further preferred embodiment of the invention, the method comprises the steps of receiving a directed message on one of the channels of an intelligent device, reading the destination address of the message. If the destination address corresponds to the address belonging to the device, the message is dispatched to a handler of the device for further processing and interpretation. Otherwise the message is forwarded via one of the other channels of the device, which channel is specified in the destination address. By such an approach, it is possible to send a message via a channel having a first protocol and forwarding it to another intelligent device via connections having different protocols.

According to a further embodiment of the invention the method comprises the step of removing the address of the receiving channel from the destination address of the message after having received the message. If the messages are to be forwarded to another intelligent device, the method comprises the step of removing the address of the forwarding channel from the destination address of the message before the message is forwarded. Thereby, the used channels are removed from the address and the address will always contain the addresses of the remaining channels for the message to be passed through.

According to a further embodiment of the invention, the method comprises the step of creating a broadcast message and sending the message via all the channels of the device. The embodiment further comprises the step of receiving a broadcast message on one of the channels of the device and forwarding the broadcast message via all of the other channels of said device.

According to a further embodiment of the invention, the method comprises the step of adding the address of the unit which generated the message to a routing field contained in the message. The embodiment further comprises the step of adding the address of the receiving channel to a routing field contained in the message after having received the message from a channel.

The embodiment further comprises the step of adding the address of the sending channel to the routing field contained in the message before sending or forwarding the message. A routing field is created up along the path of a message for the purpose of being able to track the path of the message. The routing field contains information of each channel through which the message has passed on the path followed by the message from the place where it was generated up to the last visited place.

According to a further embodiment of the invention, the method comprises the following steps when a new channel has been created: creating a search message, sending the search message via all of the previous channels of the device, receiving replies to the search message from other devices connected to the device via the previous channels and forwarding the replies via the new, added channel. Thereby, all new devices connected to the device via the new channel will have information about the addresses to all the previous devices already connected to the device. The information about the addresses to the previous devices are included in the routing field.

According to an embodiment of the invention, the method further comprises the following steps when a new channel has been created: sending the search message via the new channel, receiving replies to the search message from other intelligent devices connected to the device via the new channel, and forwarding the replies via all of the previous channels. Thereby, all the previous devices connected to the device via the previous channels, will have information about the addresses to all the new devices connected to the device via the new channel.

According to a further embodiment of the invention, the method comprises the steps of reserving a part of the bandwidth of channels connecting two intelligent devices, for sending and receiving messages from a specific source in one of the devices to a specific destination in the other device. There are situations when predictable response times for the messages are needed in order to obtain real time capabilities. This is accomplished by reserving a part or parts of a channel's bandwidth for such messages. According to an embodiment thereof, the method comprises the further steps of creating a reservation request message, sending the reservation request message, and asking said channels if they have enough bandwidth.

According to a further embodiment of the invention, the reservation request message contains the size of the requested bandwidth and an option for accepting lower bandwidth. In some applications the requested bandwidth has to be accepted, otherwise it is not possible to send the message. In other applications, it is possible to accept a lower bandwidth than the requested. By this embodiment it is possible to request a high amount of bandwidth and if the request is not fulfilled, accepting a lower bandwidth, and thereby obtain as much bandwidth as possible.

A further object of the present invention is to provide a system comprising a number of intelligent devices connected to each other, which devices are adapted for interacting with each other and automatically discovering new devices by sending and receiving messages over a network comprising a plurality of different communication protocols and/or physical connections. A system which makes it possible for intelligent devices having a limited amount of memory to communicate with other intelligent devices on the network.

This object is achieved by means of the initially defined system characterized in that the network comprises a plurality of connections having different communication protocols and that said software unit comprises means for discovering a new connection between the devices, identifying the communication protocol of the new connection, and creating a channel adapted for sending and receiving messages between the devices over the determined communication protocol. By providing the device with channels adapted for sending and receiving messages over different communication protocol, the creating and handling of the messages can be made separately from the communication handling and can thus be made independent of any communication protocol.

According to a further embodiment of the invention, said discovering and creating means are adapted for recognizing a number of predefined communication protocols and creating channels adapted for sending and receiving messages between the devices over said predefined communication protocol. According to an embodiment thereof, said discovering and creating means comprises a number of channel drivers, each one adapted for recognizing a predefined communication protocol and creating a channel adapted for sending and receiving messages between the devices over said predefined communication protocol.

According to a further embodiment of the invention said discovering and creating means is adapted for discovering disconnection of the devices and for removing the channel upon disconnection. By removing the channels when they are no longer used memory is saved and unconnected channels are avoided.

According to a further embodiment of the invention, the software unit comprises a message handling unit handling the creation of new messages and processing the messages received from other devices. The messages handling is thus separated from the handling of the communication of the messages. Preferably, said message handling unit comprises modules for handling of remote invocation, subscription of data and for discovery and retrieving information of new devices. According to an embodiment thereof, the software unit comprises a channel handling unit which handles the receiving, sending, and forwarding of messages via the channels of the device and passing the messages to and from the message handling unit.

According to a further embodiment of the invention, the message handling unit is adapted for creating a message having a destination address field and the channel handling unit is adapted for sending the message via one or more of the channels of the device, depending on the content of the address field. According to an embodiment thereof, the channel handling unit is adapted for removing the address of the receiving channel from the destination address of received messages and for removing the address of the forwarding channel from the destination address of forwarded messages.

A further object of the invention is to provide a computer data signal suitable for communication between devices in a system according to the invention. This object is achieved by a computer data signal comprising a message having an address field comprising the name of all the channels through which the message has to pass on its way to its destination.

BRIEF DESCRIPTION OF THE DRAWINGS

The invention will now be explained more closely by the description of different embodiments thereof and with reference to the appended drawings.

FIG. 4 shows in more detail how three program modules is connected to each other in the network.

FIG. 5 shows an example of addressing and creating of a routing field in a system according to the invention.

FIG. 6 shows bandwidth reservation of a channel.

DETAILED DESCRIPTION OF PREFERRED EMBODIMENTS OF THE INVENTION

A system according to the invention comprises a number of intelligent devices connected to each other through a network. A device is a unit that performs some work, e.g. a motor, a cylinder, a computer, or an industrial robot. An intelligent device in a system according to the invention comprises at least one device, a hardware unit having a processor, memory, and I/O connections, and a software unit having a program module providing functionality for controlling and monitoring the device and for interaction with other devices. The program module comprises one or more services. A service offers a set of functions for controlling and monitoring the device, for example subscription to data or execution of control commands. A device may have one or more services. When the device has more than one service, each service represent a group of functionality of a certain type, e.g. for diagnosing of the device or control of the device.

Each service belongs to a service provider. A service provider represents a device or a subsystem comprising several devices and/or service providers and is a purely logical entity. The program module may have more than one service provider each representing different devices. The program module provides the communication framework, the communication functionality, and the execution environment for the services and represents a node in the network. The program module handles all communication to and from the services. The program module is embodied in software and implements protocols for device discovery, remote method invocation, data subscription, alarm or event generation. The program module generates and sends messages from services belonging to the module and receives and interprets messages to said services.

Figure 1:
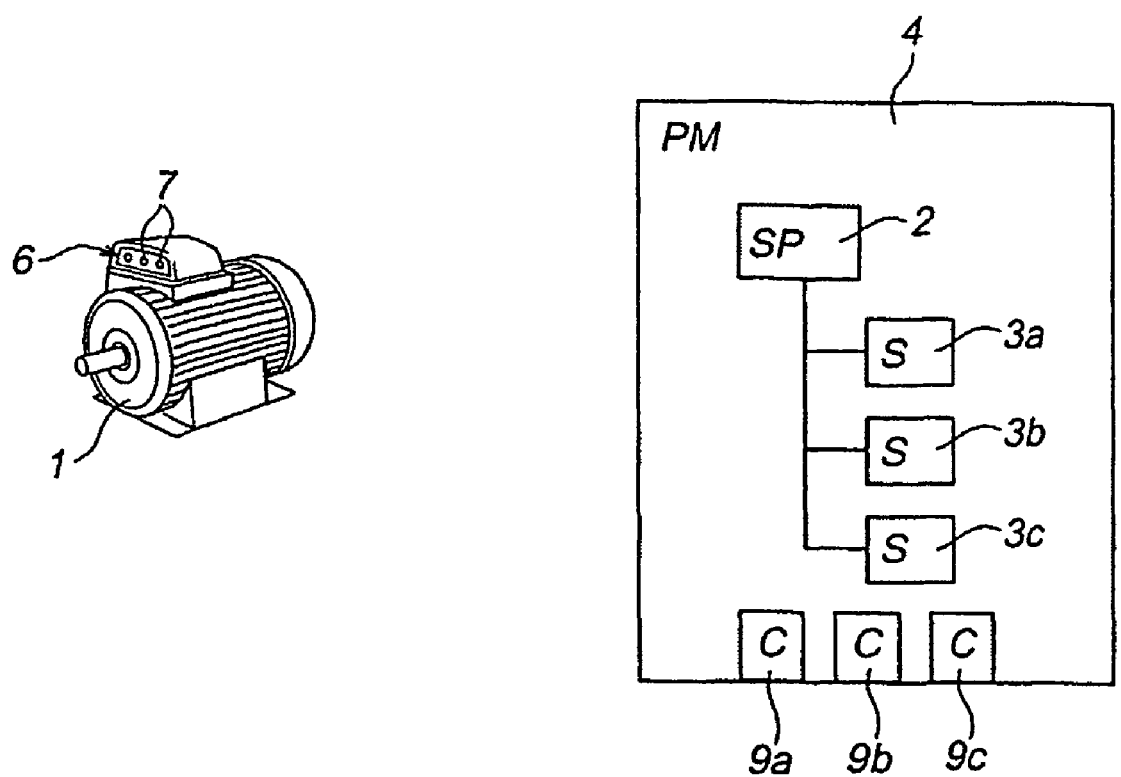
FIG. 1 shows a physical device and its software representation.

FIG. 1 shows a device 1, which is a motor, and its software representation. The device is represented by a service provider 2 which addresses three services 3a-3c, each service representing a group of functionality for monitoring and controlling the device. The first service 3a comprises functions for diagnostics, the second service 3b comprises functions for the human-machine interface, and the third service 3c comprises control functions for the device. The service provider 2 and the services 3a-3c reside within a program module 4. The device comprises a hardware unit 6 comprising a processor on which the program module 4 is run and memory for storing the program module. The hardware unit 6 comprises a number of physical connections 7 for electrical or optical connection to other devices. The program module 4 further comprises a number of channels 9a-9c adapted for sending and receiving messages to other devices over different communication protocol. The task of a channel is to translate and interpret messages of a certain communication protocol.

Intelligent and value-adding functionality is provided by the services. Services get knowledge about each other via notifications upon starting and stopping the services. After gathering knowledge about each other they may manipulate other services by accessing exposed methods as well as receiving status information by subscribing to variables, alarms, or events in other services. Thus, a service's physical device can be operated through manipulation and reading of its data.

Figure 2:
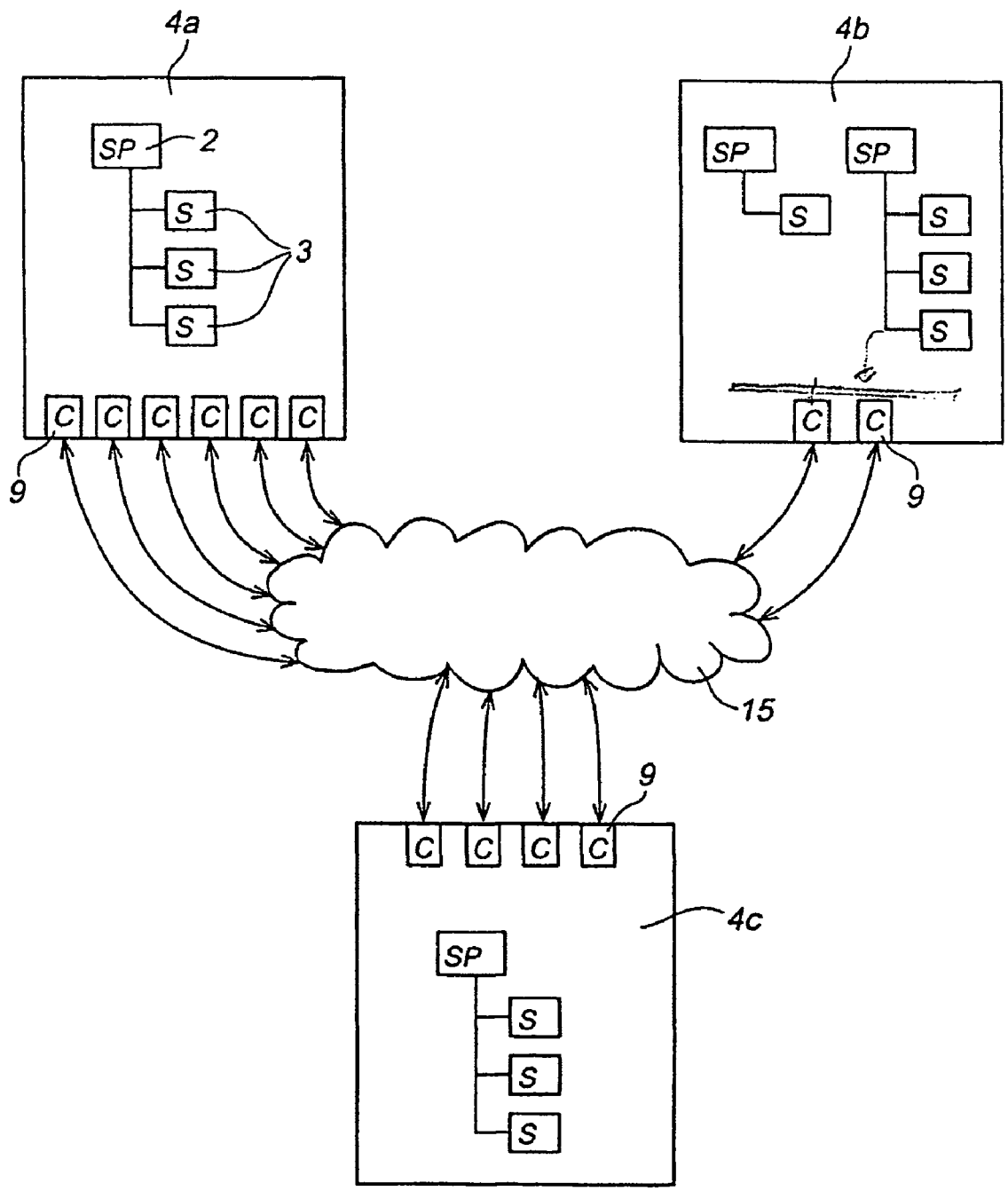
FIG. 2 shows the architecture of a system according to an embodiment of the invention.

FIG. 2 shows the architecture of a system according to the invention. The system comprises several program modules 4a-4c, each one hosting one or several services 3 and service providers 2 representing devices. The services and the service providers can be added or removed as needed. Services and service providers are connected via virtual links. The program modules are connected to other program modules through channels 9 forming a network 15. The network 15 comprises a number of further program modules not shown in FIG. 2.

The program modules communicate with each other using messages. To reach a program module from another program module, the messages have to go through several program modules which will forward the messages accordingly, i.e. not every program module has a direct connection to every other program module on the network. Every channel within a program module is connected to a channel of another program module. However, several channels may connect two program modules. In general, a program module manages services and service providers and provides the interaction between local and remote services, where local services are services located in the same program module and remote services are services located in other program modules within the same network.

Figure 3:
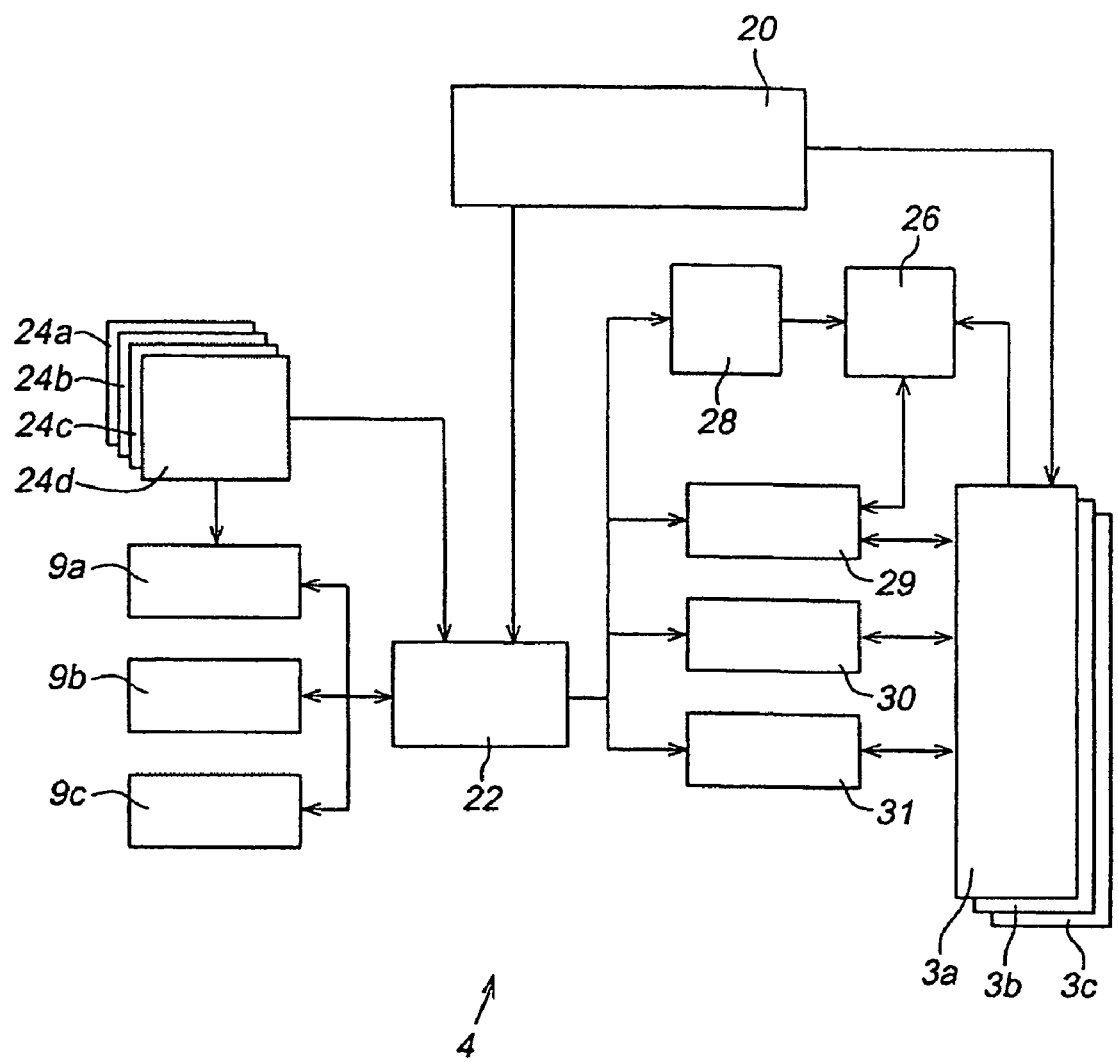
FIG. 3 show a block diagram over a program module representing the device.

FIG. 3 show a block diagram for a program module 4. The program module comprises services 3a-3c, channels 9a-9c, an administrator handler 20 which handles the administration of services and service providers, e.g. start, stop, suspend, move and rename. The program module 4 further comprises a channel handler 22 which handles forwarding, routing and dispatching of messages, a number of channel drivers 24a-24c which create new channels, a registry 26 containing all the necessary information regarding the program module, the service providers and the services hosted by the module and a number of different handlers 28-31. A search handler 28 handles the search for devices on the network. A notification handler 29 handles discovery mechanisms for detecting new devices, service providers and services. A RMI handler 30 handles remote method invocation.

A AEV handler 31 handles subscription of alarms, events, and variables.

The program module comprises a number of channel drivers 24a-24d, each assigned for a special type of physical or wireless connection having a specific communication protocol. The task of the channel driver is to discover new connections between devices, corresponding to the connection type for which the channel driver is assigned, and creating channels adapted for sending and receiving messages between the devices using the communication protocols for that type of connection. Thus, the channel driver listens for connection attempts and also attempts to create connections. Upon connection, it creates a channel and notifies the channel handler of the existence thereof. Upon disconnection, the channel driver removes the channel from the program module.

The channel driver 24a is a serial link channel driver. A serial link channel driver creates serial link channels which provide communication between devices over a serial cable. The connection by a serial link is point-to-point. The serial link channel driver checks for added or removed serial ports and reflects this by creating or removing channels. The communication protocol of a serial link is simple and comprises sending and receiving a serialized stream of characters.

Channel driver 24b is a TCP/IP channel driver. A TCP/IP channel driver can create two types of channels. The first type of channel is multicast, using User Datagram Protocol (UDP) and the other type of channel is a dedicated socket-pair defined by an IP address and a port number. With a multicast channel, a message can be sent to all other nodes connected to the same local network. It can also be used for sending messages to nodes specified by IP addresses. The type of connection between TCP/IP channels with multicast functions is point-to-multipoint, while the type of connection between socket-pair channels is point-to-point.

The channel driver 24c is a Bluetooth channel driver. A Bluetooth channel driver creates channels adapted for sending wirelessly via a Bluetooth protocol. The connection between two Bluetooth channels is of the point-to-point type.

The channel driver 24d is a telephone-network channel driver and may create channels of the type point-to-point and point-to-multipoint. In the first case, the channel is similar to a serial line channel. In the second case, the channel may be connected to several nodes with different telephone numbers and the task of the channel is to remember and handle all the telephone numbers, thus being able to send a multicast message. In the same way as for the serial line channel the protocol for a telephone network channel is simple and comprises sending and receiving a serialized stream of characters.

A channel is an independent object that is used together with a second channel to connect two different program modules. A channel is dynamically created and destroyed by the channel driver. In order to connect two program modules, each program module must host a channel of the proper type, i.e. the two channels used to connect the corresponding pair of program modules must be of the same type. A single channel of the point-to-multipoint can be used to connect one program module to several others.

Accordingly, two types of communication links can be formed using channels: point-to-point and point-to-multipoint. A point-to-point communication link is a connection between two channels of a type which can only connect to one other channel. An example of a point-to-point channel is a serial line. A point-to-multipoint communication link is a connection between channels connectable to several other channels. An example of a point-to-multipoint channel is a TCP/IP channel with UDP. A plurality of program modules connected via point-to-multipoint links form a local network in the system. Using a point-to-multipoint channel, a message can be broadcast to all program modules on that local network. A point-to-multipoint channel is addressable, which means that a directed message must specify a network address in order for the channel to know the destination channel.

In the example shown in FIG. 3, the program module comprises three channels 9a-9b. Channel 9a is a Bluetooth channel which the program module uses for connection to other program modules also having a Bluetooth channel. The two Bluetooth channels will form the required communication link. Channel 9b is a TCP/IP channel which the program module uses to connect to other program modules having a TCP/IP channel. The channel 9c a serial line channel. Each channel 9a-9c provides an interface which enables a channel handler to send messages and to inquire the states of the channels. The channels notify the channel handler when new data have arrived.

Each message coming from outside the program module arrives via one of the channels 9a-9c connected to the program module. The channel in question will pass the message to the channel handler 22. The channel handler 22 is responsible for processing messages from the other handlers 28-31 in the program module or from other program modules. The channel handler 22 examines a received message and determines if the receiving program module is addressed by the received message. If this is the case, the channel handler passes the message to the appropriate handler, according to the message type, for further processing. If the message is not addressed to the receiving program module, the channel handler will forward it to the next program module through the channel given in the message destination address. The channel handler will also forward notification and search messages via all the other channels.

The handlers 28-31 have in common that they handle incoming messages and create outgoing messages according to specified functionality protocols. A functionality protocol specifies the rules for communication between services. According to the invention, the functionality protocol and the communication protocol are separate. The handlers create the messages according to the functionality protocol and the channels translate the messages to the communication protocol required for sending the messages over a the certain connection. Thus, all messages are created and handled similarly, independently of the type of connection over which they will be sent, i.e. independently of the communication protocol of the connection.

The notification handler is responsible for processing notification messages, such as alive and bye-bye messages and for passing them to the service that may be interested in the message. The RMI handler has two major tasks: constructing outgoing remote method invocation messages and processing incoming remote method invocation messages. The AEV handler deals with messages related to subscriptions, renews subscription as well as cancels and publishes alarms, events, and variables.

The Search handler is responsible for processing incoming and outgoing search messages. Herein, an incoming search message refers to a message that arrives via one of the channels hosted by the program module. Outgoing search messages refer to messages generated by services being hosted by the program module. When a search message arrives at a program module, the search handler processes the search by looking into the registry. If the search handler finds a match between the search criteria and the registry's information, it will generate the corresponding reply message and send it to the channel handler. The channel handler will, in turn, send it back to the program module that originated the search. When a services hosted by the program module issues a search message, the message is first passed to the search handler. The search handler creates a search message and sends it to the channel handler, which will broadcast the message to the entire network via all available channels for external search. Matches in remote program modules will generate reply messages that will propagate to the service which sends the search message via the notification handler.

When a service wishes to connect, disconnect, or announce its removal from the system, the administrator handler modifies the registry and the channel handler will broadcast the message to the entire system via the channels.

FIG. 4 shows in more detail how three program modules 41, 42, 43 are connected to each other in the network. The program module 41 comprises a Bluetooth channel 45 connected to a corresponding Bluetooth channel 48 of program module 42. The channels 45 and 48 form a point-to-point communication link between the modules 41 and 42. The program module 42 also comprises a serial channel 49 connected to a corresponding serial channel 52 of program module 43. The serial channels 49 and 52 form a point-to-point communication link between the modules 42 and 43. The program module 41 further comprises a TCP/IP channel 46 of point-to-multipoint type, connected to a corresponding TCP/IP channel 53 of program module 43 and to several other program modules forming a local network 55. The TCP/IP channels 46 and 53 forms an addressable point-to-multipoint communication link between the modules 41 and 43.

General message handling mechanisms for routing, forwarding, and dispatching are performed by the channel handler. Forwarding of incoming point-to-point messages, i.e. messages having a receiving address is denoted routing. The messages can be of two different types: either a direct message having a destination address or a broadcast message having an empty destination address. A broadcast message is sent to every program module on the network. Each message comprises a message specific part, a destination address field and a routing field. The message specific part contains one or several fields that are specific for the type of message. The routing field comprises the path followed by the message from the location where it was generated up to the last visited place.

Each channel has a name which is unique within the program module, or if it is an addressable channel connected to a local network, the name is unique within the local network. The address of the message comprises the name of all the channels through which the message has to pass on its way to the destination program module, the name of the destination service provider, and the name of the destination service. The routing field is built up in the same way as the address field and it comprises the name of the sending service, the name of the sending service provider, and names of all channels through which the message has passed on its way up to the last visited place.

FIG. 5 shows a network comprising a number of program modules 60-68 connected to each other through the network. The network comprises two local TCP/IP networks 70, 71, and a local telecom network 72. As an example, program module 62 sends a directed message to program module 66. The message travels from program module 62 to program module 63, via a serial link channel BT4 connected to a serial link channel, BT3, of program module 63. Program module 63 forwards the message to program module 65, via a TCP/IP channel, IP1, and the TCP/IP network 70. The messages are received by a TCP/IP channel, IP3, of module 65. Program module 65 forwards the message via a telephone network channel, TNR1, through the telephone net- work 72 to program module 66 which receives the message via a telephone network channel, TNR2. When the message is sent from a service of program module 62, the address field contains the address:

BT4/BT3/IP1/IP3/TNR1/TNR2/receiving service provider/receiving service.

When the message has arrived at program module 66, the routing field will contain the following address:

BT4/BT3/IP1/IP3/TNR1/TNR2/Sending service/sending service provider Thus, a complete routing field may be used directly as a destination address.

If a program module sends a broadcast message, the address field is empty, and the receiving program modules will send the message on all its channels, except on the channel which received the broadcast message. If, for example, program module 63 receives a broadcast message from program module 62, it will forward the message on the channels BT1, BT2, and IP1.

When a program module receives a message via a channel, the message is forwarded to the channel handler which determines what to do with the message by examining the address field and the type of the message. According to the result, it either dispatches the message to a proper handler for further processing or forwards it either via other channels or via a defined channel.

The procedure for routing a message is as follows: if the message arrives from a channel, the first address in the address field is removed. The target channel is set to the second address in the address field. If the target channel is an addressable channel, the third address in the address field is used as the address on the local network, and the message is sent via the target channel. If the message instead arrives from one of the handlers, the target channel is set to the first address in the address field. If the target channel exists, the message is sent via that channel, otherwise a non-acknowledged message is created and sent to the source by use of the routing field.

A notification or a search message arriving at one channel is forwarded to all the other channels of the program module, which channels are not included in the routing field, and is passed to either the notification handler or the search handler. Before the channel handler forwards a notification or search message, it adds the name of the sending channel to the routing field contained in the message. This forwarding procedure ensures that all services will get one notification/search reply for each path (sequence of channels) that the message can travel between two program modules, leaving the decision about which path to use to the service.

When a message is forwarded (for broadcast messages) or routed (according to the address field in point-to-point requests), the routing field is created according to the following procedure. If the message arrives at a channel, the name of the arrival channel is added to the beginning of the routing field. If the message arrives from an internal handler, nothing is added to the routing field (the name of the service provider and the service have already been added in the handler). A message is sent over all the other channels and the name of the sending channel is added to the beginning of the routing field.

The channel handler examines the type of an incoming message and if the destination address is empty, i.e. does not contain any channel names, the channel handler dispatches the message to the appropriate handler. For each type of message, there is one dedicated handler. For each point-to-point message, either a request or a reply, the corresponding handler sends an acknowledgement message which let the originator of the message to know that the message has been received and is being processed and thus there is no need to re-send the message.

When a service, service provider, program module, or channel is removed from the system, the other program modules have to be notified. This notification is made by alive or bye-bye messages. When a service is removed from the system, the program module hosting the service sends a bye-bye message via all of its channels. This message is created and sent by the notification handler upon receiving such an order from the registry. Once the message is sent, the service can be removed from the system. In the same way, the program module sends a bye-bye message when a service provider or a channel is removed.

When a program module is removed, all its channels must automatically be removed and a bye-bye message must be sent for each channel. When a service, service provider, or a program module is added to the system, the other program modules in the system have to be notified. When a service is added to the system, the program module hosting the service being added must send an alive message via all its channels. This message is created and sent by the notification handler, upon receiving such an order from the registry. When a service provider is added to the system, the corresponding program module sends an alive message on all of its channels. When a program module is added, all the other program modules in the system are notified of the location and the lifetime of the added program module via an alive message sent via all channels.

To introduce a new channel and inform all devices comprised in the network that a new path is available, the channel handler carries out the following procedure: when a new channel is added to a program module, the channel handler generates a search message that is sent via all of the previous channels of the program module. Subsequently, as devices comprising the network replies to the search messages, the channel handler will forward the replies via the new added channel. If the added channel is of the type point-to-multipoint, a search is also issued on the new channel, and responses are converted into alive notifications which are sent to the first network. This procedure will introduce the new routing path, allowing the connection of two independent networks.

Accordingly, a channel may be used to connect two independent networks. The channel handler is responsible for connecting the two networks. When a new channel is created by a first program module on a first network and connected to a channel of a second program module on a second network, the channel handler performs a search within the hosting program module and within the first network via the channels already connected to the program module. In response to the search messages, the program modules on the first network generates alive notifications for all entities, e.g. services, found in the search. The alive notifications are sent through the new channel and forwarded to all the other program modules on the second network. In the same way, the second program module performs a search on the second network and generates corresponding alive messages which are sent to all the program modules on the first network. Thus, all devices on both networks will be informed about all other devices, in which they might be interested.

There are situations when predictable response times for RMI, alarm, event, or variable publishing or information retrieval are needed in order to obtain real time capabilities. This is accomplished by reserving a part, or parts, of a channel's bandwidth resource pool solely for the needs of one service. The channel handler keeps track of each channel's reservations, i.e. the allowed traffic load for each channel, and the type of messages to let through the reserved bandwidth resource, FIG. 6 shows the bandwidth resource of a channel. A channel initially comprises a portion of bandwidth resource 80 that cannot be reserved, and a portion 81 which is available for one or several reservations. The bandwidth resource 80 that cannot be reserved is used for all other messages. The reserved bandwidth resources are only to be used for dedicated messages.

When a reservation is needed, the portion of the bandwidth resource 81 is reserved until no more reservations can be done. As shown in FIG. 6, three portions 82, 83, 84 of the bandwidth resource pool 81 have been reserved. The part of the bandwidth resource pool which has not yet been reserved is temporarily used for all other messages.

When a service needs a reserved path, i.e. bandwidth, to another service for its messages, it issues a reservation request. The request is passed to the channel handler. The channel handler will ask the channel, which it will use for its bandwidth. If the channel has enough bandwidth and the channel handler allows parts of it to be reserved, the channel handler will create a reservation request message to be sent to the next channel handler, if any, in the chain. When the next channel handler receives a reservation request message, it first asks the channel used for the incoming messages for its bandwidth. Also, if the target service resides in another program module, the channel handler must ask the channel used for the outgoing messages for its bandwidth.

Finally, when the message reaches the program module, residing in the target service, the channel handler in question will ask this service for its bandwidth. All reservation requests are granted if each channel and service have enough bandwidth, and each channel handler estimates that it is possible to handle the reserved path. The last visited channel handler will then send a reservation reply message containing the granted bandwidth to the channel handler that originated the request. If any of the reservation requests cannot be granted, the chain of requests will fail. The last visited channel handler will then send a reservation reply message containing the lowest granted bandwidth available to the channel handler that originated the request. If all available bandwidth already has been reserved in any of the instances, the reservation reply message will return with a granted bandwidth of zero. No reservation will be made in this case. The channel handler will send a reply to the service that originated the reservation request to tell if the reservation was granted.

The reservation request comprises an option for accepting a lower bandwidth than requested. If it is acceptable to have a lower bandwidth, a flag, called accept-lower flag, is set to "true" in the reservation request. Otherwise, the accept-lower flag is set to "false". The granting process depends on the accept-lower flag. If the accept-lower flag is set to false, the chain of requests will fail as soon as the request cannot be fulfilled. However, if the accept-lower flag is set to true, the chain of requests will proceed, and the lowest granted bandwidth will be returned via the reservation reply message.

The present invention is not limited to the embodiments disclosed but may be varied and modified within the scope of the following claims. For example which handlers is comprised in the program module may vary depending on which functionality is desired of the program module.

The invention claimed is:

1. A method for providing a system of intelligent devices connected to each other through a network, wherein the devices interact with each other and the device automatically discover new devices by sending and receiving messages over the network, the method comprising:

connecting a first intelligent device to a second intelligent device via a connection having a communication protocol, discovering with the first device and the second device the connection and identifying the communication protocol of the connection, wherein the identifying identifies a plurality of TCP/IP, Bluetooth, null modem, telephone modem, GSM, and GPRS, wherein the identifying is carried out utilizing a plurality of channel drivers each arranged for using a different protocol, creating with the first device and the second device for each of the first device and the second device, respectively, a channel adapted to send and receive messages between the first device and the second device over the identified communication protocol, each of the channels being adapted to translate and interpret messages by the identified communication protocol, creating with the first device and the second device a directed message comprising a destination address field and adding a destination address to the destination address, the destination address comprising the address of at least one sending channel and at least one receiving channel and any intermediate channels between the at least one sending channel and the at least one receiving channel, and sending with the first device and the second device the directed message from one of the first device and the second device to another of the first device and the second device via said channels specified in the destination address field.

2. The method according to claim 1, further comprising:

creating new channels by repeating the connecting, the discovering and the creating for at least one further intelligent device which is connected to one of the first device and the second device via a connection having a different communication protocol.

3. The method according to claim 1, further comprising:

disconnecting one of the first device and the second device from another of the first device and the second device, discovering the disconnection, and removing for each of the devices the non-connected channels.

4. The method according to claim 2, further comprising:

receiving a directed message on one of the channels of the at least one further device;

reading a destination address of the message; and if the destination address corresponds to the address associated with the at least one further device, sending the message to a handler of the at least one further device for further processing and interpretation, otherwise forwarding the message via one of the other channels of the at least one further device, which channel is specified in the destination address.

5. The method according to claim 4, further comprising:

removing the address of the receiving channel from the destination address of the message after receiving the message.

6. The method according to claim 5, further comprising:

removing the address of the forwarding channel from the destination address of the message before the message is forwarded.

7. The method according to claim 1, further comprising:

creating a broadcast message, and sending the message via all the channels of the first device or the second device.

8. The method according to claim 2, further comprising:

receiving a broadcast message on one of the channels of the at least one further device, and forwarding the broadcast message via all of the other the channels of the at least one further device.

9. The method according to claim 1, further comprising:

adding the address of the device that generated the message to a routing field contained in the message.

10. The method according to claim 4, further comprising:

adding the address of the receiving channel to a routing field contained in the message after receiving the message from a channel.

11. The method according to claim 9, further comprising: adding the address of the sending channel to the routing field contained in the message before sending or forwarding the message.

12. The method according to claim 9, further comprising when a new channel has been created:
creating a search message,
sending the search message via all of the previous channels of the device that generated the message,
receiving replies to the search message from other devices connected to the device that generated the message via the previous channels, and
forwarding the replies via the new added channel.

13. The method according to claim 12, further comprising: sending the search message via the new channel,
receiving the replies to the search message from first device and the second device connected to the at least one further device via the new channel, and
forwarding the replies via all of the previous channels.

14. The method according to claim 1, further comprising: reserving part of the bandwidth of the channels, and
connecting the first device and the second device for sending and receiving messages from a specific source in one of the first device and the second device to a specific destination in another of the first device and the second device.

15. The method according to claim 14, further comprising: creating a reservation request message,
sending the reservation request message, and
asking said channels if they have sufficient bandwidth.

16. The method according to claim 15, wherein the reservation request message contains the size of the requested bandwidth and an option for accepting a lower bandwidth.

17. A system comprising
a number of intelligent devices connected to each other through a network, wherein the devices are adapted to interact with each other and to automatically discover new devices by sending and receiving messages over the network, each of the intelligent devices having a hardware unit and a software unit, wherein the network comprises a plurality of connections having different communication protocols and wherein said software unit of each intelligent device comprises means for discovering a new connection between the devices, and means for identifying the communication protocol of the new connection, wherein identifying the communication protocol is carried out utilizing a plurality of plurality of channel drivers each arranged for using a different protocol, wherein identifying the communication protocol includes identifying a plurality of TCP/IP, Bluetooth, null modem, telephone modem, GSM, and GPRS, for creating with each intelligent device a channel adapted to send and receive messages over the identified communication protocol and translate and interpret messages of the identified communication protocol, and for creating with each intelligent device a directed message comprising a destination address field and adding a destination address to the destination address, the destination address comprising the address of at least one sending channel and at least one receiving channel and any intermediate channels between the at least one sending channel and the at least one receiving channel, and, in cooperating with other channels, sending and receiving with each intelligent device the directed messages between the devices over the determined communication protocol.

18. The system according to claim 17, wherein said discovering and creating means are adapted for recognizing a number of predefined communication protocols and creating channels adapted to send and receive messages between the devices over said predefined communication protocols.

19. The system according to claim 17, wherein said discovering and creating means comprise a number of channel drivers which are each adapted to recognize a predefined communication protocol and to create a channel adapted to send and receive messages between the devices over said predefined communication protocol.

20. The system according to claim 17, wherein said discovering and creating means are adapted to discover disconnection of the devices and to remove the channel upon disconnection.

21. The system according to claim 17, wherein the software unit comprises a message-handling unit handling the creation of new messages and processing messages received from other devices.

22. The system according to claim 17, wherein said message-handling unit comprises modules for handling remote calls, for subscription to data, and for discovering and retrieving information about new devices.

23. The system according to claim 17, wherein the software unit comprises a channel-handling unit that handles the receiving, sending and forwarding of messages via the channels of the device, and forwards messages to and from the message-handling unit.

24. The system according to claim 23, wherein the message-handling unit is adapted to create a message having a destination address field, and the channel-handling unit is adapted to send the message via one or more of the channels of the device in dependence on the contents of the address field.

25. The system according to claim 23, wherein the channel-handling unit is adapted to remove the address of the receiving channel from the destination address of received messages and for removing the address of the forwarding channel from the destination address of forwarded messages.

26. The system according to claim 23, wherein the channel-handling unit is adapted to update a routing field contained in the message by adding the address of the sending channel to the routing field before sending or forwarding the message and adding the address of the receiving channel to the routing field after having received the message from a channel.

27. The system according to claim 17, wherein each of the channels comprises a portion of bandwidth available for at least one reservation for messages from a specific source in a first intelligent device to a specific destination in a second intelligent device, connected to the first device via the network, and a portion of bandwidth which cannot be reserved.

28. A computer program product, comprising:
a computer readable medium; and
computer program instructions recorded on the computer readable medium and executable by a processor for providing communication in a system of intelligent devices connected to each other through a network utilizing a method comprising connecting a first intelligent device to a second intelligent device via a connection having a communication protocol, discovering with the first device and the second device the connection and identifying the communication protocol of the connection, wherein the identifying identifies a plurality of TCP/IP, Bluetooth, null modem, telephone modem, GSM, and GPRS, wherein the identifying is carried out utilizing a plurality of channel drivers each arranged for using a different protocol, creating with the first device and the second device for each of the first device and the second device, respectively, a channel adapted to send and receive messages between the first device and the second device over the identified communication protocol, each of the channels being adapted to translate and interpret messages by the identified communication protocol, creating with the first device and the second device a directed message comprising a destination address field and adding a destination address to the destination address, the destination address comprising the address of at least one sending channel and at least one receiving channel and any intermediate channels between the at least one sending channel and the at least one receiving channel, and sending with the first device and the second device the directed message from one of the first device and the second device to another of the first device and the second device via said channels specified in the destination address field.

29. The computer program product according to claim 28, wherein the computer program instructions further comprise instructions for creating new channels by repeating the discovering and the creating for at lest one further intelligent device which is connected to one of the first device and the second device via a connection having a different communication protocol.

\* \* \* \* \*